Patented Feb. 22, 1944

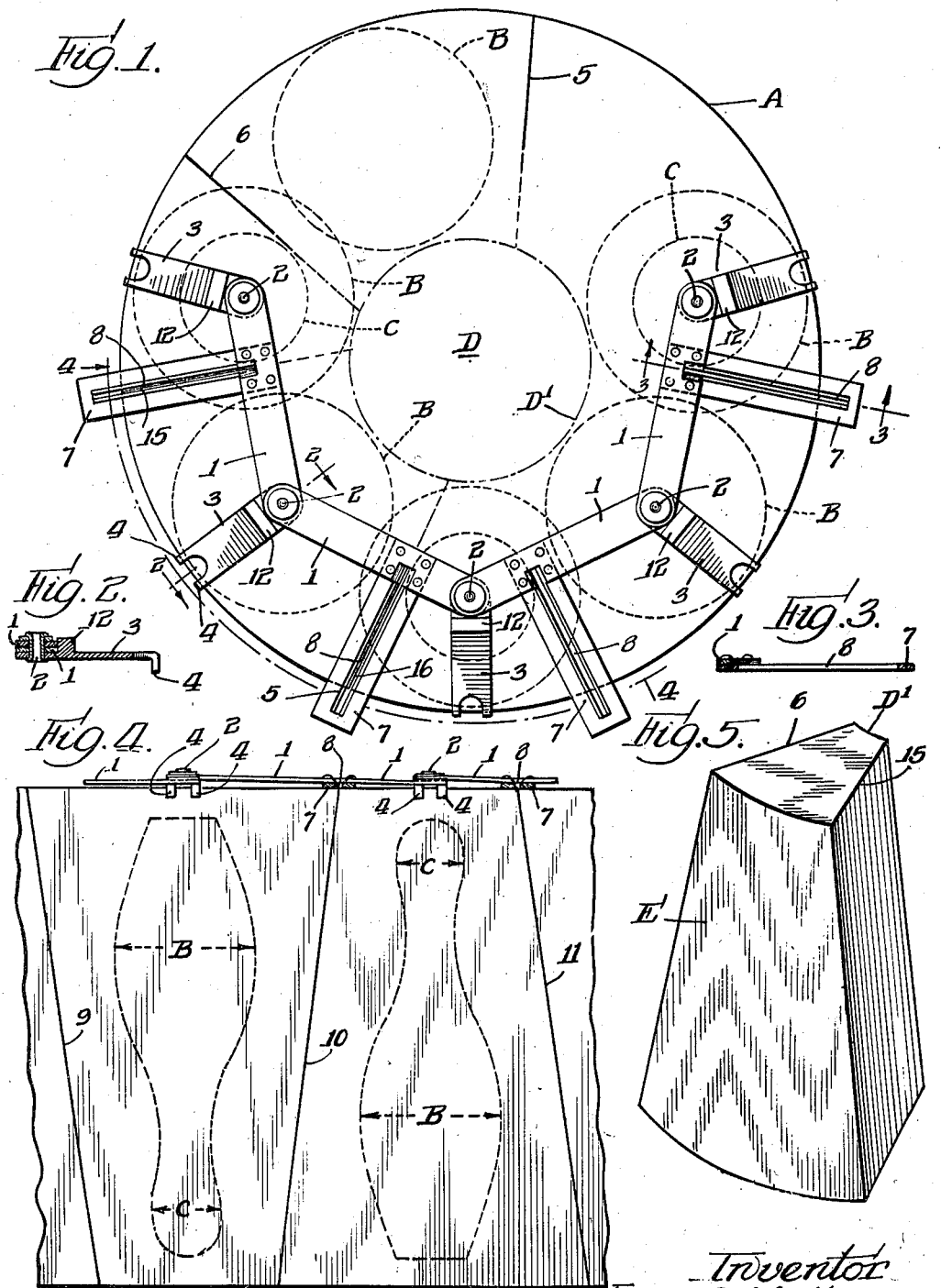

2,342,155

UNITED STATES PATENT OFFICE 2,342,155

MARKING GAUGE

Jesse O. Matteson, Muskegon, Mich., assignor to The Brunswick-Balke-Collender Company, Chicago, Ill., a corporation of Delaware Application March 16, 1942, Serial No. 434,825

12 Claims. (Cl. 33—98)

This invention relates to the manufacture of bowling pins, or similar articles of generally tapered form which are made of wood and for which the blocks or billets are cut directly from a log or cylindrical length of the material.

One object of the invention is to facilitate the marking of such a log preparatory to cutting billets therefrom, and to insure that such marking shall secure the maximum number of billets from a log of a given size.

Another object of the invention is to provide a marking gauge which shall be readily applicable to the end of a log and which shall include means for guiding a marking pencil or other tool in laying out the proper lines for the cutting of several billets with a single placement of the gauge.

A further object of the invention is to provide a gauge for marking the end of a log preparatory to cutting billets therefrom, such gauge being adjustable to logs of various sizes but adapted to mark them all for billets of substantially the same size.

More specifically it is an object of the invention to provide an articulated marking gauge which includes gauge members adapted to position the gauge at a definite distance inwardly from the curved outline of the end of the log, and which also includes marking guides positioned so as to define alternately wide and narrow areas representing the ends of billets to be cut from the log.

Other objects and advantages of the invention will appear from the following description taken in conjunction with the drawing, in which—

Figure 1 is a more or less diagrammatic top plan view indicating the end of a log as circular and showing a marking gauge embodying this invention placed thereon in the position of use;

Figure 2 is a detail section taken as indicated at line 2—2 on Figure 1;

Figure 3 is a detail section taken as indicated at line 3—3 on Figure 1;

Figure 4 is a fragmentary developed side elevation of the log on a smaller scale than Figure 1 and showing a portion of the gauge resting on the upper end thereof in the position of use and indicating in dotted outline the forms of two bowling pins to be cut from adjacent billets taken from the log;

Figure 5 is a perspective view on a still smaller scale than the other figures showing a single billet cut from a log in accordance with the marking thereon by the gauge of this invention.

While the invention is susceptible of various modifications and alternative constructions, the embodiment shown in the drawing and described hereinafter is by way of preferred illustration only, and it is not intended that the invention be limited thereto or thereby; but it is the intention to cover all modifications and alternative constructions falling within the spirit and scope of the invention as defined by the appended claims.

The marking gauge to which this invention relates is designed for marking logs of approximately cylindrical blocks of wood to be cut up into billets in accordance with the procedure generally outlined and explained in my copending application, Serial No. 396,527, filed June 4, 1941, which is directed to certain methods for making billets for bowling pins and the like. As explained therein, it is customary, in order to secure bowling pins which shall be of straight grain and substantially uniform in character and quality, to cut a log into sectoral billets large enough to be turned down into the form and size of a bowling pin. Since a bowling pin is of generally tapered form the billet may be made smaller at one end than the other, and for the most economical utilization of the material in a given log the adjacent billets will be tapered in opposite directions. Thus in marking the end of the log preparatory to cutting billets therefrom, the ends of the billets will be represented by successively wide and narrow sectoral areas.

Although most logs are not perfectly circular in cross-section, Figure 1 represents the outline of one end of the log by means of the circle A, which will serve for the purpose of the following explanation and description. The dotted circles B represent substantially the maximum diameters of the bowling pins to be cut from the log, and the dotted circles C represent the maximum diameters of the pins at their smaller ends. In Figure 4 the corresponding diameters of the bowling pins shown in broken outline are indicated as dimensions B and C.

The gauge device includes a plurality of links 1, preferably of flat metal stock, connected together end to end by pivots 2, and similar pivots 2 are provided at the extremities of the end links of the series. Each of the pivots 2 also serves to attach to the links 1 a gauge arm 3 which extends transversely of the links 1 and which is formed with downwardly bent terminal lugs or flanges 4—4 at its outer end for engagement with the cylindrical surface of the log at its outline A. Thus when the gauge device is applied to the end area of the log, as in Figure 1, the gauge arms 3 serve to position the pivots 2 at equal distances inwardly from the peripheral outline A, and the links 1, being all of the same length, form an incomplete polygonal outline within the area of the circle A.

Each pivot 2 may be considered as disposed at the axis of one of the bowling pins to be cut from the log, the axis of the pin to extend as nearly as possible parallel to the central axis of the log itself. The purpose of the marking gauge is, therefore, to facilitate the placing of guide lines, such as the lines 5 and 6, on Figure 1, which shall define the side walls of the billets out of which these bowling pins can be made. Therefore each of the links 1 carries a marking guide arm 7 secured to the link and extending rigidly therefrom, preferably at right angles to the link, and this guide arm is formed with a slot 8 of sufficient width to accommodate the point of a pencil or other marking tool. The guide 7 is not attached to the link 1 at the middle of its length but at a point which divides the link into a longer and a shorter segment; and the links are so connected together at their ends that the longer segments of adjacent links shall be joined together by the pivots 2, and similarly the shorter segments of adjacent links are connected by the remaining pivots 2. Thus the spaces between the adjacent guides 7 are alternately wide and narrow spaces corresponding, respectively, to the larger and smaller ends of the adjacent billets.

Thus when the gauge is placed on the end of the log as in Figure 1, with the lugs 4—4 of each gauge arm 3 contacting the curved surface at the outline A, it is only the work of a moment to draw a marking pencil through each of the guide slots 8 in the guide arms 7 so as to produce corresponding marks on the surface of the log. If the log is of such a size that the marks produced by a single setting of the gauge do not account for all the available area at the end of the log, the gauge may be re-set in a second or even a third position with two adjacent guide arms 7—7 overlapping two of the marks already made. Thus, in Figure 1 it may be assumed that the marks 5 and 6 were made by a previous setting, as well as the marks 15 and 16, and that the gauge has been re-set with two of its guide slots 8—8 overlying the marks 15 and 16 preparatory to completing the marking of the log by drawing additional lines to the remaining guide slots of the device.

As thus employed the gauge provides for a series of billets whose end areas occupy an annular portion of the circle A representing the end of the log so as to leave a central area or core D which will differ somewhat from the outer portion of the log as to grain and quality and is therefore not to be considered available for the same purpose as the said billets.

With one end of the log thus marked with lines such as the lines 5 and 6 it will ordinarily be unnecessary to actually mark the vertical lines such as 9, 10 and 11 seen in Figure 4 to define the longitudinal edges of the billets since the log can be supported on a tiltably adjustable sawtable with a bandsaw or circular ripsaw, traveling in the vertical plane, or a similar tool following the guide lines 5 and 6, etc., and subsequently working around the circular outline D—1 of the core D for detaching this material from the billets. Thus a finished billet will have the appearance of that shown at E in Figure 5, in which the upper end is bounded by portions of the circular outline A and the core outline D—1, together with the marks of lines 6 and 15.

In view of the jointed nature of the gauge with its several links and pivots 2, each of the gauge arms 3 is formed with an upstanding stop lug 12 disposed at a distance from the pivot 2 substantially equal to half of the width of the link 1, and the ends of the links 1 are rounded concentrically about their pivots 2, so that, while the links can fold about their pivots in one direction so as to form obtuse angles with the gauge arms 3, they are prevented from folding outwardly so as to form acute angles with the adjacent gauge arms. Thus, when out of use, the gauge may be folded up into fairly compact form, and when it is unfolded the stop lugs 12 will prevent the links 1 from assuming awkward positions from which it might be difficult to re-adjust them for application to the end of the log as in Figure 1.

It may be understood that if desired, the gauge may be employed upon both ends of the log and the longitudinal outlines indicated at 9, 10 and 11 in Figure 4 may also be applied if the cutting tool or machine which is to form the billets is such as to require this more nearly complete outlining; and it will also be evident that other methods than those herein suggested may be employed for cutting the billets apart, depending upon the tools or machine available. In general a particular gauge made up in accordance with this invention will produce suitable markings for billets having certain end areas and will secure a maximum number of such billets from any log to which it is applied within reasonable limits of variations of diameter of the log. Ordinarily such a gauge will be made up in connection with the production of a bowling pin of a certain size and for producing an article of different deminsions a different gauge will usually be necessary unless it should happen that the end areas of the billets for both articles are similar; that is to say, the gauge does not determine the length of the billets and billets of different lengths may therefore be produced with similar end areas if desired.

I claim as my invention:

1. A marking gauge for the purpose indicated comprising a plurality of links pivotally connected end to end, gauge arms extending transversely of the links at their ends and each pivotally attached to the links, each gauge arm having a flange at its outer end remote from such pivotal connection, and marking guides, each secured rigidly to one of the links and extending transversely therefrom at a position intermediate the link pivots.

2. A marking gauge for the purpose indicated comprising a plurality of links pivotally connected end to end, gauge arms extending transversely of the links at their ends and each pivotally attached to the links, each gauge arm having a flange at its outer end remote from such pivotal connection, and marking guides, each secured rigidly to one of the links and extending transversely therefrom at a position intermediate the link pivots at the same side of the link as the adjacent gauge arms.

3. A marking gauge for the purpose indicated comprising a plurality of links pivotally connected end to end, gauge arms extending transversely of the links at their ends and each pivotally attached to the links, each gauge arm having a flange at its outer end remote from such pivotal connection, and marking guides, each secured rigidly to one of the links and extending transversely therefrom at a point which divides the links into a longer and a shorter segment.

4. A marking gauge for the purpose indicated comprising a plurality of links pivotally connected end to end, gauge arms extending transversely of the links at their ends and each pivotally attached to the links, each gauge arm having a flange at its outer end remote from such pivotal connection, and marking guides, each secured rigidly to one of the links and extending transversely therefrom at a point which divides the links into a longer and a shorter segment, the longer segments of adjacent links being connected together at the pivotal connection of the links.

5. A marking gauge for the purpose indicated comprising a plurality of links pivotally connected end to end, gauge arms extending transversely of the links at their ends and each pivotally attached to the links, each gauge arm having means at its outer end providing a stop surface which extends transversely of the gauge arm, and slotted marking guides, each rigidly associated with one of the links, their marking slots extending at right angles to a line connecting the pivotal connections.

6. A marking gauge to be placed on the end of an approximately cylindrical block, said gauge including a plurality of members pivotally connected in a series end to end, and positioning stop means extending transversely of the end surface of the block to contact its cylindrical surface at intervals, with connections from said stop means to said members spacing the pivotal connections between said members all at the same distance inward from the cylindrical surface of the block, each of said members carrying a separate marking guide formed to direct a marking tool along a line on the end surface of the block substantially at right angles to a line connecting the nearest adjacent pair of pivotal connections of the members.

7. A marking gauge to be placed on the end of an approximately cylindrical block, said gauge including a plurality of members pivotally connected end to end, and positioning stop means extending transversely of the end surface of the block to contact its cylindrical surface at intervals, with connections from said stop means to said members spacing the pivotal connections between said members all at the same distance inward from the cylindrical surface of the block, each of said members carrying a marking guide formed to direct a marking tool approximately at right angles to a line connecting the nearest adjacent pair of pivotal connections of the members, said marking guides being spaced apart by alternately wide and narrow spaces of generally sectoral form relative to the circular end area of the block.

8. A marking gauge for the purpose indicated comprising a plurality of links pivotally connected end to end, gauge arms extending transversely of the links at their ends and each pivotally attached to the links, each gauge arm having a flange at its outer end remote from such pivotal connection, and marking guides, each secured rigidly to one of the links and extending transversely therefrom at a position intermediate the link pivots, together with stop means at each of said pivotal connections arranged to prevent adjacent links from swinging in one direction beyond a position of alignment.

9. A marking gauge for the purpose indicated comprising a plurality of links pivotally connected end to end, gauge arms extending transversely of the links at their ends and each pivotally attached to the links, each gauge arm having a flange at its outer end remote from such pivotal connection, and marking guides, each secured rigidly to one of the links and extending transversely therefrom at a position intermediate the link pivots, together with a stop lug on each of said gauge arms positioned for encounter with the links to which it is attached, said lug acting to prevent either link from swinging toward the arm at an angle less than a right angle.

10. A marking gauge for the purpose indicated comprising a plurality of links pivotally connected end to end and each consisting of a strip of flat stock, a gauge arm of flat stock attached to the links at each of the connecting pivots, similar gauge arms pivotally attached to the outer ends of the terminal links of the series, each gauge arm having its outer end bent downwardly to form a stop flange, and marking guides, each secured rigidly to one of the links and comprising a strip of flat stock with a longitudinal slot therein extending transversely from the link at the same side of the link as the adjacent gauge arms and at a position intermediate the link pivots.

11. A marking gauge to be placed on the end surface of an approximately cylindrical block, said gauge including a plurality of links pivotally connected in a series end to end, and means for positioning all their connecting pivots at the same distance inward from the periphery of said end surface, comprising parts extending transversely from the links and having stop means disposed transversely of said end surface for contact with the cylindrical surface of the block, each link having separate marking guide means at a point intermediate its ends.

12. A marking gauge to be placed on the end surface of an approximately cylindrical block, said gauge including a plurality of links of equal length pivotally connected end to end, and means for positioning all the connecting pivots at the same distance inward from the periphery of said end surface, comprising parts extending outwardly from the links and having stop means disposed transversely of said end surface for contact with the cylindrical surface of the block, each link having marking guide means at a point which divides the link into a longer and a shorter segment, the pivotal connections being arranged to join said shorter segments of adjacent links together and to join said longer segments of adjacent links together.

JESSE O. MATTESON.